United States Patent
Hui

(10) Patent No.: US 9,241,153 B2
(45) Date of Patent: Jan. 19, 2016

(54) CONTRAST ADJUSTED ANAGLYPH FOR REDUCING GHOSTING ARTIFACTS

(71) Applicant: STMicroelectronics Asia Pacific Pte. Ltd., Singapore (SG)

(72) Inventor: Lucas Hui, Isuites @ Tani (SG)

(73) Assignee: STMICROELECTRONICS ASIA PACIFIC PTE. LTD., Singapore (SG)

( * ) Notice: Subject to any disclaimer, the term of this patent is extended or adjusted under 35 U.S.C. 154(b) by 139 days.

(21) Appl. No.: 13/856,342

(22) Filed: Apr. 3, 2013

(65) Prior Publication Data

US 2014/0300601 A1    Oct. 9, 2014

(51) Int. Cl.
| | |
|---|---|
| *G02B 27/22* | (2006.01) |
| *H04N 13/04* | (2006.01) |
| *H04N 13/00* | (2006.01) |
| *G06T 5/00* | (2006.01) |
| *G06T 5/50* | (2006.01) |

(52) U.S. Cl.
CPC ............ *H04N 13/0431* (2013.01); *G06T 5/008* (2013.01); *G06T 5/50* (2013.01); *H04N 13/0018* (2013.01); *H04N 13/0025* (2013.01); *G06T 2207/10021* (2013.01); *G06T 2207/10024* (2013.01)

(58) Field of Classification Search
CPC .................... G02B 27/2214; H04N 13/0022
USPC ........................................................ 345/426
See application file for complete search history.

(56) References Cited

U.S. PATENT DOCUMENTS

| | | | |
|---|---|---|---|
| 7,424,148 B2 | 9/2008 | Goh | |
| 7,953,286 B2 | 5/2011 | Chiang et al. | |
| 2011/0057948 A1* | 3/2011 | Witt et al. | 345/593 |
| 2012/0007819 A1* | 1/2012 | Hewes et al. | 345/173 |
| 2012/0038830 A1* | 2/2012 | Flores et al. | 348/672 |
| 2013/0044939 A1* | 2/2013 | Li | 382/154 |
| 2014/0218410 A1* | 8/2014 | Hu et al. | 345/690 |

OTHER PUBLICATIONS

Singh et al., "Design and Implementation of CIC Based Decimation Filter for Improved Frequency Response," Emerging Trends in Electronic and Photonic Devices & Systems; Dec. 2009; Abstract only; retrieved from the Internet Oct. 21, 2014; 2 pages.
Kim et al., "A New Dynamic Decimation Filter Using Polyphase MACs for Medical Ultrasound Imaging," Ultrasonics Symposium; Nov. 2008; Abstract only; retrieved from the Internet Oct. 21, 2014; 2 pages.

(Continued)

*Primary Examiner* — Ming Hon
*Assistant Examiner* — Shivang Patel
(74) *Attorney, Agent, or Firm* — Allen, Dyer, Doppelt, Milbrath & Gilchrist, P.A.

(57) ABSTRACT

A system adjusts contrast of an anaglyph image and includes a contrast adjuster processor that generates a contrast-adjusted first luma signal and second luma signal and a contrast-adjusted third luma signal from a first input image signal and second input image signal. An upstream summing node determines a first difference between the first luma signal and third luma signal and a downstream summing node subtracts the first difference from the first signal component of the first input signal. A fine adjuster circuit receives a signal for the first difference and applies a fine adjustment as a gain adjustment, an offset adjustment, and a horizontal and vertical shift.

34 Claims, 7 Drawing Sheets

(anaglyph)

(56) References Cited

OTHER PUBLICATIONS

Zanjani et al., "Algorithmic Design of High-Precision Low-Power Multi-Stage Decimation Filters," Circuits and Systems, 49th IEEE International Midwest Symposium; vol. 2; Aug. 2006; Abstract only; retrieved from the Internet Oct. 21, 2014; 2 pages.

Yi et al., "Low-Power Area-Efficient Decimation Filters in Sigma-Delta ADCs," Electron Devices and Solid-State Circuits, Dec. 2007; Abstract only; retrieved from the Internet Oct. 21, 2014; 2 pages.

Zanjani et al., "A Comparative Study and Design of Decimation Filter for High-Precision Audio Data Converters," Microelectronics; Dec. 2005; The 17th International Conference; Abstract only; retrieved from the Internet Oct. 21, 2014; 2 pages.

Nerurkar et al., "Low Power Sigma Delta Decimation Filter," Circuits and Systems, 45th Midwest Symposium; vol. 1; Aug. 2002; Abstract only; retrieved from the Internet Oct. 21, 2014; 2 pages.

Grayver et al., "Low Power, Area Efficient Programmable Filter and Variable Rate Decimator," Circuits and Systems; 2000 IEEE International Symposium; vol. 5; May 2000; Abstract only; retrieved from the Internet Oct. 21, 2014; 2 pages.

Anonymous, "Anaglyph Methods Comparison," http://3dtv.at/Knowhow/AnaglyphComparison_en.aspx, Retrieved from the Internet Oct. 21, 2014, 9 pages.

Dubois, "Dubois Anaglyph," http://www.site.uottawa.ca/~edubois/anaglyph/, Retrieved from the Internet Oct. 21, 2014, 2 pages.

U.S. Appl. No. 13/723,584, filed Dec. 21, 2012.

Dubois, "A Projection Method to Generate Anaglyph Stereo Images," ICASSP 2001 Proc. of IEEE, vol. 3, pp. 1661-1664 (2001).

Sanftmann et al., "Anaglyph Stereo Without Ghosting," Computer Graphics Forum, vol. 30, No. 4, pp. 1251-1259 (2011).

\* cited by examiner (stereoscopic left)

(stereoscopic right)

(red left)

(blue/green right)

(anaglyph)

(left component)

(right component(s))

CONTRAST ADJUSTED ANAGLYPH FOR REDUCING GHOSTING ARTIFACTS

BACKGROUND

1. Technical Field

The technology relates to stereographic image processing, and more particularly to reducing ghosting artifacts associated with contrast adjustments to anaglyph images.

2. Discussion of the Related Art

Anaglyph imaging is a technique for producing three-dimensional (3D) images of an object. The images may be still images or video images. Anaglyph imaging involves producing stereoscopic image pairs, typically left and right stereoscopic images. The stereoscopic images may be processed to form a single two-dimensional (2D) anaglyph image that can be printed on an object, e.g., in a magazine, or that can be electronically displayed, e.g., on a video display or television. The single anaglyph image may be viewed through spectacles having different color filters for the left and right eyes, so that the viewer perceives a three-dimensional (3D) rendering of the scene when viewing the 2D anaglyph image. Anaglyph imaging techniques can enable 3D viewing from conventional 2D displays.

SUMMARY

Methods and apparatus for producing contrast-adjusted anaglyphs are described. Adjusting contrast in an anaglyph imaging technique can introduce ghosting artifacts in anaglyph images. The ghosting artifacts can degrade the imaging quality and be distracting to a viewer. The methods and apparatus described herein employ signal processing and compensation techniques to reduce or eliminate ghosting artifacts that would otherwise be introduced by contrast adjustments.

According to some embodiments, a system for adjusting contrast of an anaglyph image may comprise a first anaglyph transformer configured to generate a first anaglyph image signal. The first anaglyph image signal may be formed from one or more signal components of received input signals. The system may further comprise a contrast adjuster configured to apply a contrast adjustment to the first anaglyph image signal, a first input image signal, and a second input image signal. The first and second input image signals may be first and second stereoscopic images received by the system. The system may further include at least one upstream summing device configured to calculate a first difference between the contrast-adjusted first input image signal and the contrast-adjusted first anaglyph signal, and to calculate a second difference between the contrast-adjusted second input image signal and the contrast-adjusted first anaglyph signal.

According to some embodiments, the system for adjusting contrast of an anaglyph image may further comprise at least one downstream summing device configured to subtract the first difference from the first input image signal to produce a first compensated image signal, and to subtract the second difference from the second input image signal to produce a second compensated image signal. The system may further include a second anaglyph transformer configured to generate a second anaglyph signal from the first compensated image signal and the second compensated image signal. The generated second anaglyph signal may comprise a 2D composite contrast-adjusted anaglyph signal for generating a 2D composite anaglyph image that is to be displayed on a video display. When viewed using 3D spectacles, the 2D composite image may exhibit reduced or substantially eliminated ghosting artifacts.

Aspects of contrast adjustment for anaglyph images may be implemented in acts of methods, and may further be embodied in machine-readable instructions that are encoded in one or more manufactured storage devices. For example, a method for adjusting contrast of anaglyph images may comprise acts of receiving a first input image signal and a second input image signal, and generating a first anaglyph signal from the first input image signal and the second input image signal. The method may further comprise receiving and applying a contrast adjustment to the first input image signal, the second input image signal, and the first anaglyph signal. Additionally, the method may include calculating a first difference between the contrast-adjusted first input image signal and the contrast-adjusted first anaglyph signal, and calculating a second difference between the contrast-adjusted second input image signal and the contrast-adjusted first anaglyph signal. According to some embodiments, the method may further comprise subtracting the first difference from the first input image signal to produce a first compensated image signal, and subtracting the second difference from the second input image signal to produce a second compensated image signal. The method may further include generating a second anaglyph signal from the first compensated image signal and the second compensated image signal. The second anaglyph signal may comprise a signal for generating a 2D composite anaglyph image that is to be displayed on a video display.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing.

DETAILED DESCRIPTION

By way of introduction, FIGS. 1A-1E depict one process by which an anaglyph image may be formed. An image of a scene may first be captured as a stereoscopic pair 100 of images (e.g., left and right). In one embodiment, the pair of images may be color images that are used to produce a color anaglyph, and may correspond to images that would be perceived separately by an individual's left and right eyes. The pair of images 100 (FIG. 1A, FIG. 1B) may appear to be nearly identical, except they may be recorded from different angles.

To produce anaglyph images, the images may be processed. Each image may be a color image, and may be represented using a tri-color basis, e.g., red, blue, and green. Other color bases including black, white, and/or grayscale bases, may be used in other embodiments of anaglyph imaging, and in some cases colors may be altered to produce black and white or grayscale anaglyphs. To prepare an anaglyph image, components of each stereographic image may be processed. To facilitate explanation, a color basis of red, green, and blue will be used.

In describing various aspects of the technology, the terms "image" and "image signal" may be used interchangeably when referring to data representative of an image that may be processed and displayed on a video display to produce an image. The meaning of "image" and "image signal" will be clear to one of ordinary skill in the art from the context of the discussion in which the term or terms appear.

According to one embodiment of anaglyph imaging, a signal corresponding to the left image (FIG. 1A) may be processed to retain only the red component (represented by FIG. 1C) and to remove the blue and green components. A signal corresponding to the right image (FIG. 1B) may be processed to retain green and blue components (represented by FIG. 1D) and to remove the red component. The processed left and right images may generate two or more intermediate anaglyph image signals (e.g., FIGS. 1C-1D). A composite 2D anaglyph image (represented by FIG. 1E) may be generated by combining the intermediate images signals according to a selected anaglyph generation method and displaying the combined result. A viewer may view the composite anaglyph image using "3D" spectacles in which a red filter is located in front of the left eye and a cyan filter is located in front of the right eye. For many viewers, the visual cortex interprets the composite anaglyph image viewed through the spectacles as a 3D image.

Figure 1A:
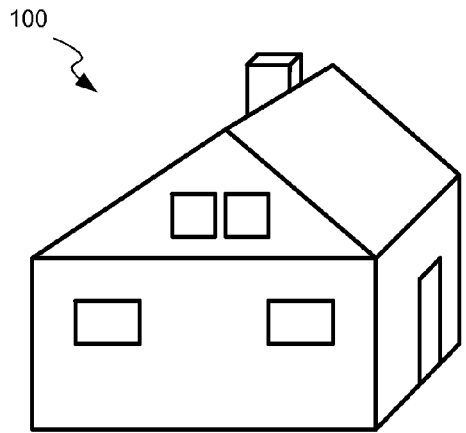
FIGS. 1A-1E depict one process by which an anaglyph image may be formed.
Figure 1B:
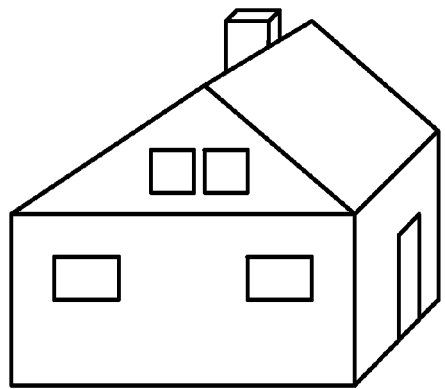
Figure 1C:
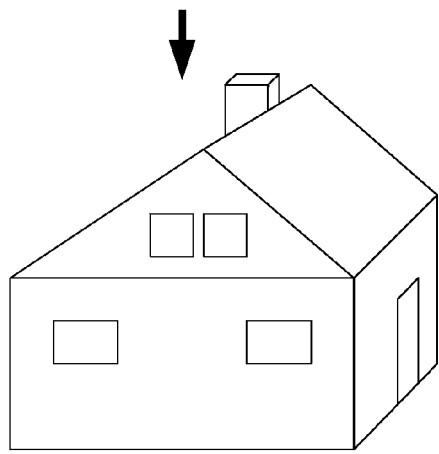
Figure 1D:
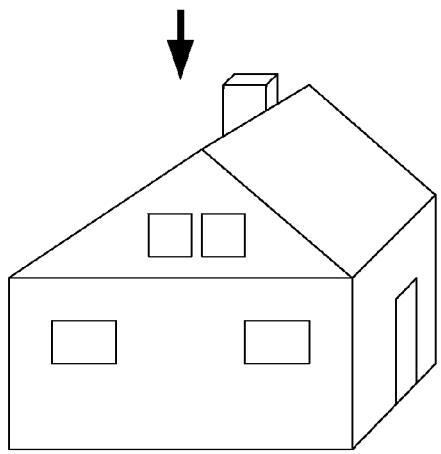
Figure 1E:
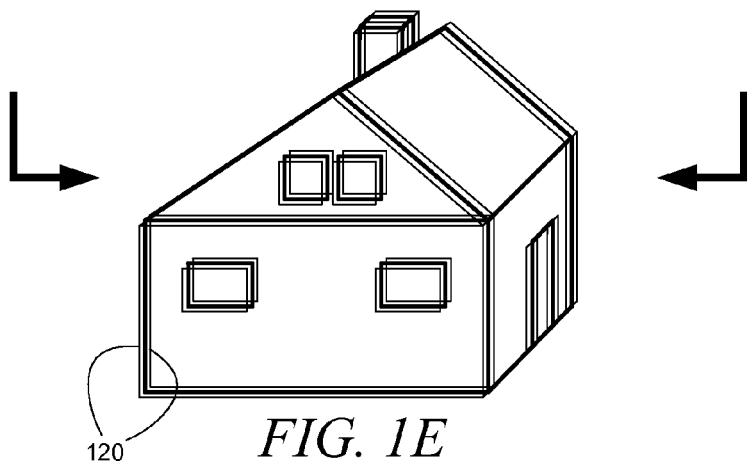

When a composite anaglyph image is viewed with the naked eye, ghosting 120 appears in the image. For example, the image may appear to be comprised of multiple exposures of the scene that are slightly offset from one another, as depicted in FIG. 1E. Such ghosting is normal for a composite anaglyph image when viewed with the naked eye, but should not be present when the composite anaglyph is viewed through the 3D spectacles.

In some cases, ghosting may occur when composite anaglyphs are viewed properly using 3D spectacles for a variety of reasons. For example, the generation of the composite anaglyph may be of low quality such that color components are not weighted or filtered correctly. In some cases, low quality 3D spectacles may result in the appearance of ghosting artifacts. For example, the filter set for the spectacles may not be well matched to the color basis used to generate the anaglyph. In some cases, there may be a discrepancy between the printing or display of colors computed for the composite anaglyph image and the actual colors printed or displayed. Generally, ghosting occurs when one or more colors intended to be blocked for one eye leaks through the 3D spectacles.

The inventors have found that contrast adjustments made in anaglyph imaging processes can lead to ghosting in perceived 3D images. For example, a composite anaglyph image may be provided to a conventional television set that is capable of conventional contrast adjustment. When the conventional contrast adjustment (which may include gamma correction) is applied in YUV color space to the composite image or to signal components used to form the composite image, ghosting is introduced and can be observed in the perceived 3D image. The ghosting may also be observed in intermediate images used to create a final composite 2D anaglyph image that is provided for display on the television monitor.

Figure 2A:
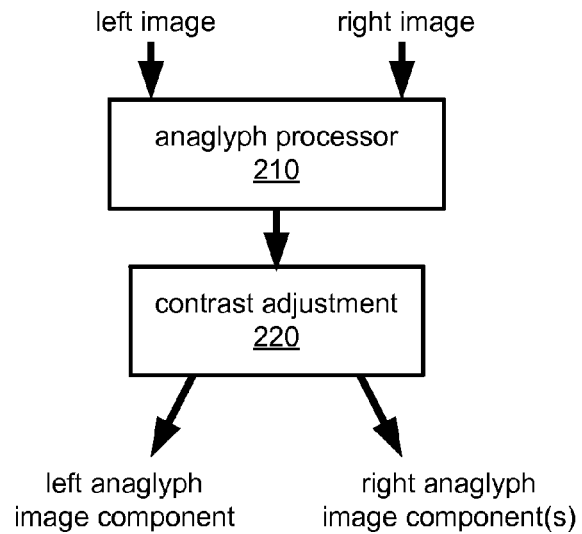
FIG. 2A-2C illustrates an example of contrast adjustment in anaglyph imaging technique.
Figure 2B:
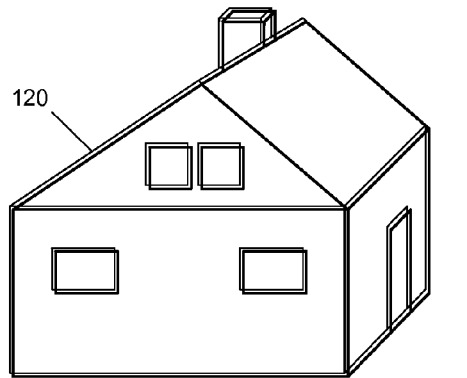
Figure 2C:
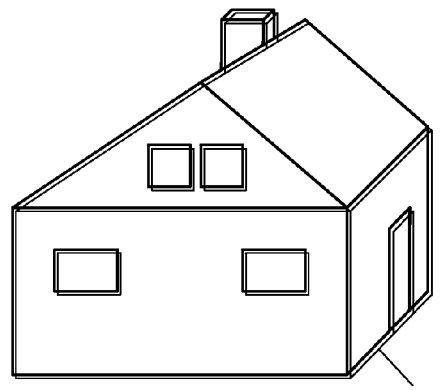

An example of undesirable ghosting introduced by contrast adjustment is depicted in FIGS. 2A-2C. In this example, left and right stereoscopic images may be received by a receiver that may include an anaglyph processor 210 and a contrast adjuster 220. The anaglyph processor 210 may prepare a composite anaglyph image or signal components used to generate the composite anaglyph image from the received left and right stereoscopic images. Contrast adjustment may be applied to the composite anaglyph image or the signal components using the contrast adjuster 220 in an effort to improve the quality of an image. Because of the contrast adjustment, the intermediate anaglyph images (FIGS. 2B-2C) may exhibit ghosting artifacts 120 that are not present in images that were not subjected to contrast adjustment. For example, the intermediate images of FIGS. 1C-1D exhibit no ghosting, whereas the intermediate images of FIGS. 2B-2C exhibit ghosting that has been introduced due to the contrast adjustment. The ghosting artifacts introduced by the contrast adjustment may carry through to the final perceived 3D image, producing an undesirable viewing artifact.

Ghosting introduced by contrast adjustment can be better understood from the following analysis. In this analysis, a red/cyan anaglyph scheme is considered, but the analysis is not limited to a red/cyan anaglyph scheme. Similar results may occur for other color-coded anaglyph schemes including true anaglyph and gray anaglyph schemes.

According to one embodiment, a left stereoscopic image value $I_L$ and a right stereoscopic image value $I_R$ may be represented at each pixel of an image by red, blue, and green color components:

$$I_{L,x,y} = (R_{L,x,y}, G_{L,x,y}, B_{L,x,y}) \tag{1a}$$

$$I_{R,x,y} = (R_{R,x,y}, G_{R,x,y}, B_{R,x,y}) \tag{1b}$$

where R, G, and B represent an intensity level of the corresponding red, green, and blue color components, respectively.

A composite anaglyph image may be prepared from the left and right stereoscopic images according to the following equations. In one embodiment, the luma (Y) and chroma ($P_r$, $P_b$) signals may be prepared for the anaglyph image. The (x,y) subscript is omitted to simplify the expressions.

$$Y = 0.7152 G_R + 0.0722 B_R + 0.2126 R_L \tag{2a}$$

$$P_r = -0.4542 G_R - 0.0458 B_R + 0.5000 R_L \tag{2b}$$

$$P_b = -0.3854 G_R + 0.5000 B_R - 0.1146 R_L \tag{2c}$$

When contrast adjustment is made to the composite anaglyph, it may be applied to the luma component only. For example, Y may be adjusted to become Y', where $$Y' = Y + C(Y). \tag{3}$$

In this example, the contrast adjustment is represented by the term C(Y).

In general, contrast adjustment may be a predetermined functional operation that is applied to one or more selected components of the image signal. According to one embodiment, the contrast adjustment may be represented by the following expression.

$$C(Y) = C(0.7152 G + 0.0722 B + 0.2126 R) \tag{4}$$

In this case, a functional operation corresponding to the contrast adjustment is applied to a weighted sum of the red, green, and blue color components. Contrast adjustment of an anaglyph image may be implemented for the luma (Y) component of the anaglyph image given in EQ. 2a, e.g., $G \to G_R$, $B \to B_R$, and $R \to R_L$ in EQ. 4.

From EQS. 3 and 4, it can be seen that contrast adjustment couples additional color components through C(Y) into the contrast-adjusted luma signal Y'. This coupling can lead to ghosting. For example, the red-left image component $R_L'$ of the contrast-adjusted composite anaglyph image can be computed from the (Y', $P_r$, $P_b$) components.

$$R_L' = Y' + 1.5748 P_r = R_L + C(Y) \quad (5)$$

Since C(Y) may include all color components (as can be seen from EQ. 4, for example), blue and green color components will be introduced into the left intermediate anaglyph image. The introduction of these color components generates ghosting in the intermediate image, as depicted in FIG. 2B, for example. Further, these unwanted color components in the left image will not be blocked by the complimentary color filter for the right eye. A similar effect occurs for the right intermediate image.

The net result from contrast adjustment of the composite anaglyph image is to introduce unwanted ghosting into the perceived 3D image. When viewing the composite anaglyph image with 3D spectacles, ghosting occurs because an image intended to be viewed by only one eye is viewed at least partially by the other eye. In the above example, the coupling of blue/green color components into the left/red image permits the left anaglyph image to be viewed by both eyes. The resulting ghosting distorts the perception of a 3D image, as features within the image may appear to the viewer to be displayed twice in two different locations.

Figure 3B:
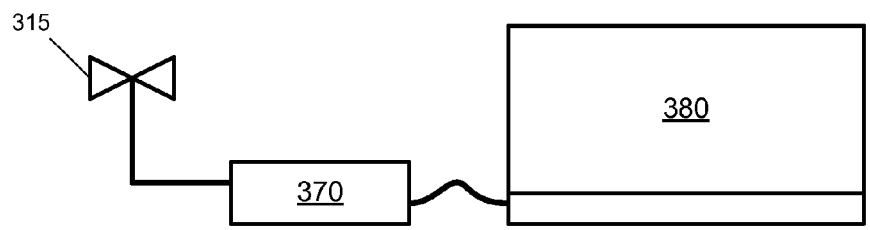
FIG. 3B illustrates one embodiment of a system in which contrast adjustment may be implemented.
Figure 3A:
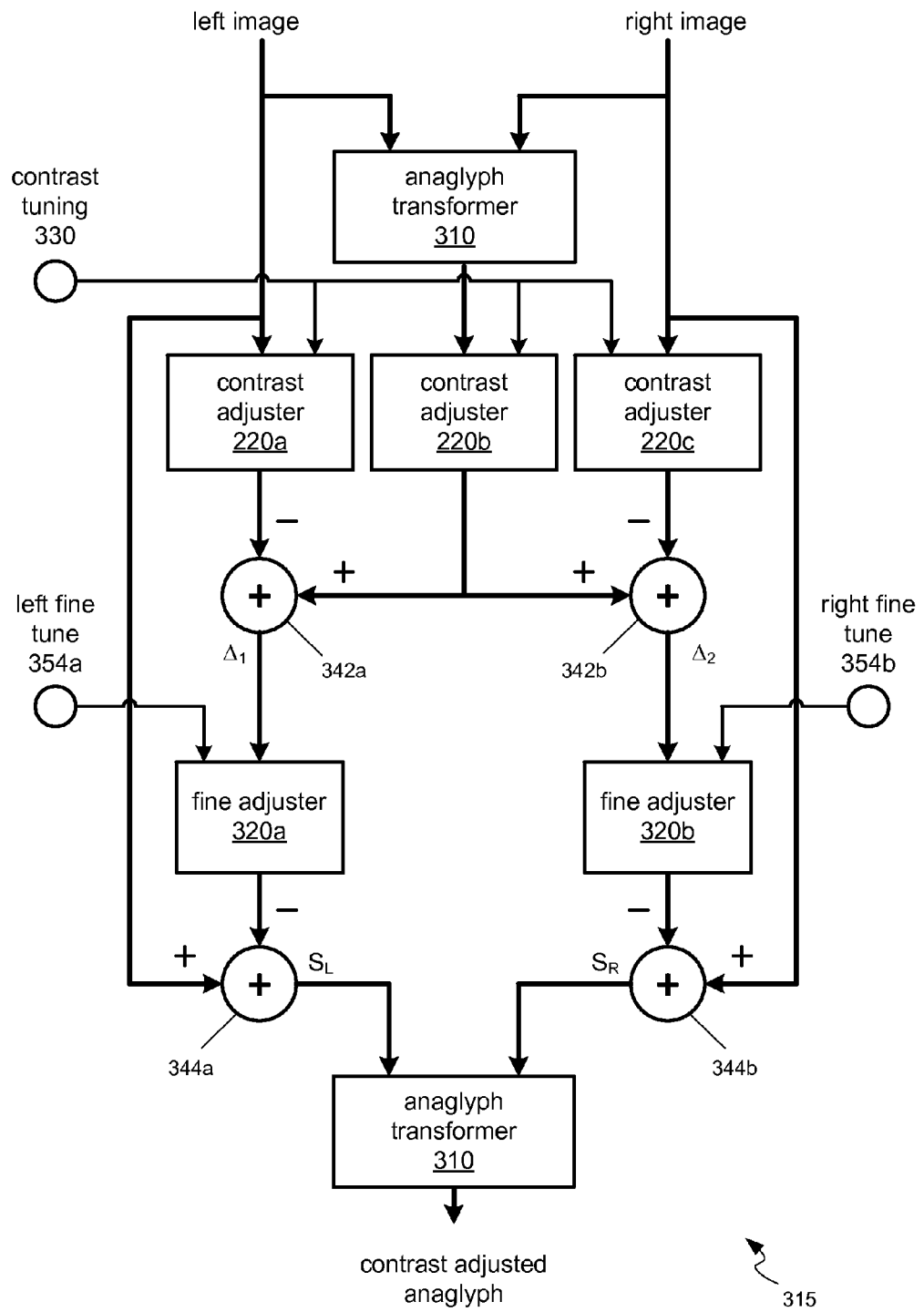
FIG. 3A depicts an embodiment of a system that provides contrast adjustment with reduced ghosting for anaglyph images.

An embodiment of anaglyph contrast-adjustment apparatus 300 for reducing ghosting introduced by contrast adjustment to an anaglyph image is depicted in FIG. 3A. The apparatus depicted may be implemented in image processing apparatus for a set-top-box or any other device configured to output 2D images, or for a television or any other device that is configured to display 2D images. For example, the contrast-adjustment apparatus 300 may be implemented as a component of a television system depicted in FIG. 3B. The contrast-adjustment apparatus 300 may be implemented as hardware, software, or a combination thereof in a television set 380 or a set-top box 370 or other suitable receiving apparatus. In some implementations, the contrast-adjustment apparatus 300 may be implemented as hardware, software, or a combination thereof in over-the-top (OTT) boxes, media servers, home gateways, personal computers, tablets, mobile phones, video or still cameras, etc. Video signals or still images received from a source 315 may be processed by the contrast-adjustment apparatus 300 before being provided for display.

According to one embodiment, the contrast-adjustment apparatus 300 comprises at least one anaglyph transformer 310, at least one contrast adjuster 220a, 220b, 220c, and summing nodes 342a, 342b, 344a, 344b. The anaglyph contrast-adjustment apparatus 300 may further include at least one fine adjuster 320a, 320b though the fine adjusters may not be present in some embodiments. The summing nodes 342a, 342b, 344a, and 344b may be arranged as shown in FIG. 3A.

The one or more contrast adjusters 220a, 220b, 220c may be implemented as hardware circuitry, software, or a combination thereof. The software may execute on at least one processor. In some implementations, contrast adjusters may be implemented using field-programmable gate arrays. The one or more contrast adjusters 220a, 220b, 220c may have a shared input 330, as shown, for receiving a contrast adjustment signal that is applied to each contrast adjuster. In some embodiments, the one or more contrast adjusters 220a, 220b, 220c may have separate inputs for separately receiving contrast adjustment signals. The contrast adjustment signal or signals may be provided from manual adjustments made by a user of the apparatus. In some embodiments, the contrast adjustment signal or signals may be provided from a system controller or from feedback circuitry configured to automatically adjust contrast in the anaglyph imaging system.

Contrast adjustments applied to anaglyph signals may be implemented using any suitable technique for adjusting contrast. Contrast-adjustment (e.g., adjustment 220a, 220b, 220c) may be made by a user of the system, a technician at a factory, or by an automated control system that utilizes feedback from a contrast-adjusted image to determine a contrast-adjustment level. According to some embodiments, contrast is adjusted according to the following equation:

$$Y' \approx S\text{Curve}[\text{Gamma}(Y)] \quad (6)$$

where Y is the luma value for an input image signal, and $\text{Gamma}(Y) \approx Y^G$. Further, $$S\text{Curve} \approx (2Y)^S/2 \text{ for } 0 < Y \leq 0.5; \text{ or}$$

$$1 - [2(1-Y)]^S/2 \text{ for } 0.5 < Y \leq 1.0. \quad (7)$$

G and S may be contrast tuning values. For example, nominal values of G and S may be 0.6 and 2.0, respectively, and these values may be altered when adjusting contrast.

In some embodiments, contrast adjustment may be made according to delta enhancement, for example:

$$Y' \approx S\text{Curve}[\text{Gamma}(Y)] - Y \quad (8)$$

In some implementations, contrast adjustment may be made according to predefined look-up tables (LUTs). In some cases, contrast adjustment may be made according to predefined contrast curves, e.g., as described in U.S. Pat. No. 7,424,148, which is incorporated herein by reference in its entirety. In some cases, contrast adjustment may be histogram based, e.g., as described in U.S. Pat. No. 7,953,286, which is incorporated herein by reference in its entirety.

An anaglyph transformer 310 may be implemented as hardware circuitry, software, or a combination thereof. The software may execute on at least one processor. In some implementations, anaglyph transformer 310 may be implemented using field-programmable gate arrays. Anaglyph transformer 310 may be configured to receive input image signal components and generate a composite anaglyph image from the received signal components. For example, anaglyph transformer 310 may receive signal components from left and right stereographic images and generate a composite 2D anaglyph image for display using any suitable anaglyph generation method. Although two anaglyph transformers are shown in FIG. 3A, a single anaglyph transformer may be used in some implementations to execute the functionality of the two anaglyph transformers. For example, a single anaglyph transformer may process multiple received signals from different sources using different processing threads or by buffering and time multiplexing the signals.

The fine adjusters 320a, 320b may be implemented as hardware circuitry, software, or a combination thereof. The software may execute on at least one processor. In some implementations, fine adjusters may be implemented using field-programmable gate arrays. The fine adjusters may have separate or shared fine tune inputs 354a, 354b for receiving fine adjustment control signals. The fine adjustment signal or signals may be provided from manual adjustments made by a user of the apparatus. The fine adjustment signal or signals may be provided from a system controller or feedback circuitry configured to automatically adjust contrast in the anaglyph. According to some implementations, the fine adjusters may be incorporated with, or located just prior to or just after, the respective contrast adjusters. For example, a left image fine adjuster 320a may be located just after the left contrast adjuster 220a and before summing mode 342a. In some cases, fine tuning may be applied alternatively or additionally to the left and right stereographic images received as inputs to the anaglyph contrast-adjustment apparatus 300.

Fine adjustments (e.g., fine adjustments 320a, 320b) may be made manually by a user of the system, a technician at a factory, or by an automated control system that utilizes feedback from an image to improve image quality. In some embodiments, fine adjustments applied to the signals by fine adjusters 320a, 320b are the same for each signal. In some implementations, fine adjustments applied to the signals by fine adjusters 320a, 320b are different for each signal. Fine adjustments may include gain and/or offset adjustments applied to one or more signal components. Fine adjustments may include horizontal and/or vertical shift adjustments applied to one or more signal components. Fine adjustments may include adjustments described in U.S. patent application Ser. No. 13/723,584, filed Dec. 21, 2012 and titled "Anaglyph Ghost Cancellation," which is incorporated herein by reference in its entirety.

In operation, stereographic left and right image signals may be received by the anaglyph contrast-adjustment apparatus. The stereographic left image signal may be provided to a first anaglyph transformer 310, and to at least one contrast adjuster 220a. The stereographic left image signal may also be provided to a downstream summing node 344a.

The stereographic right image signal may be provided to the first anaglyph transformer 310, and to at least one contrast adjuster 220c. The stereographic right image signal may also be provided to a downstream summing node 344b.

The first anaglyph transformer 310 may process the stereographic left and right image signals to form a composite anaglyph image signal using any suitable anaglyph scheme. The first anaglyph transformer 310 may provide as output the composite anaglyph image signal or at least a portion or component thereof. For example, in some embodiments the first anaglyph transformer 310 may provide as output the luma (Y) component of the composite anaglyph image signal. The output from the first anaglyph transformer 310 may be provided to at least one contrast adjuster 220b.

Contrast adjustment may be applied to the left stereographic image signal (or a portion thereof), the output from the first anaglyph transformer 310, and the right stereographic image signal (or a portion thereof) by the at least one contrast adjuster 220a, 220b, 220c. Although three contrast adjusters are shown in FIG. 3A, the applied contrast adjustment may be the same at each device. In some implementations, different contrast adjustments may be applied in two or more of the contrast adjusters. In some embodiments, a single contrast adjuster may be used to apply the same contrast adjustment to the left stereographic image signal, the output from the first anaglyph transformer 310, and the right stereographic image signal.

A contrast adjustment applied to an image may, in some embodiments, be implemented as applying the contrast adjustment to one or more signal components of an image. For example, an image may be prepared as $(Y, P_r, P_b)$ signals, and the contrast adjustment may be applied to only the Y (luma) signal component of the image. In some embodiments, contrast adjustment may be applied to all signal components of the image. Further, the image encoding used for images received by the contrast adjusters 220a, 220b, 220c may be the same or different from the image encoding used for images output by the contrast adjusters. For example, images may be received as (R, G, B) signals and converted to and output as $(Y, P_r, P_b)$ signals or one or more components thereof. In some implementations, an image may be prepared as $(Y, C_r, C_b)$ signals. The luma component may be a gamma-corrected luma component in some implementations.

Outputs from the one or more contrast adjusters may be provided to upstream summing nodes 342a, 342b. The summing nodes may be implemented as software, hardware, or a combination thereof. The upstream summing nodes may be configured to compute a difference between a contrast-adjusted composite anaglyph image signal and a contrast-adjusted stereographic component image signal, as depicted. For example, a first left channel summing node 342a may be configured to compute a difference $\Delta_1$ between the contrast-adjusted composite anaglyph image signal (or component thereof) that is output from the contrast adjuster 220b and the contrast-adjusted stereographic left image signal (or component thereof) that is output from the contrast adjuster 220a. Similarly, right channel summing node 342b may be configured to compute a difference $\Delta_2$ between the contrast-adjusted composite anaglyph image signal (or component thereof) and the contrast-adjusted stereographic right image signal (or component thereof).

According to some embodiments, outputs from the first summing nodes 342a, 342b are provided to fine adjusters 320a, 320b, where fine tuning signals may be applied to the computed differences. Outputs from the fine adjusters may be provided to second summing nodes 344a, 344b. In some implementations, fine adjusters 320a, 320b may be omitted.

At the second or downstream summing nodes 344a, 344b, the differences $\Delta_1$, $\Delta_2$ computed at summing nodes 342a, 342b between a contrast-adjusted composite anaglyph image and a contrast-adjusted stereographic component image are subtracted from respective input stereographic images. The resulting left image signal $S_L$ and right image signal $S_R$ are provided to an anaglyph transformer 310 to produce a contrast-adjusted anaglyph. By compensating the input left and right stereographic images with the computed differences $\Delta_1$, $\Delta_2$ in contrast-adjusted images, ghosting caused by contrast adjustment can be reduced or substantially eliminated from the perceived 3D anaglyph.

Methods for reducing ghosting in contrast-adjusted anaglyphs in accordance with the embodiment depicted in FIG. 3A and other embodiments described herein may be applied to various anaglyph imaging processes. For example, the methods may be applied to red/cyan anaglyphs, red/blue, red/green, yellow/blue, green/magenta anaglyphs as well as anaglyphs formed using other color decomposition combinations. The methods may be applied to true anaglyph imaging techniques, grey, color, half-color, and optimized anaglyph imaging techniques. Additionally, the methods may be applied to improved anaglyph imaging techniques, such as those described in "A Projection Method to Generate Anaglyph Stereo Images," E. Dubois, ICASSP 2001 Proc. of IEEE, Vol. 3, pp. 1661-1664, (2001) and in "Anaglyph Stereo Without Ghosting," Harald Sanftmann, Daniel Weiskopf, *Comput. Graph. Forum*, Vol. 30, No. 4, pp. 1251-1259, (2011), which are incorporated herein by reference in their entirety.

Figure 3C:
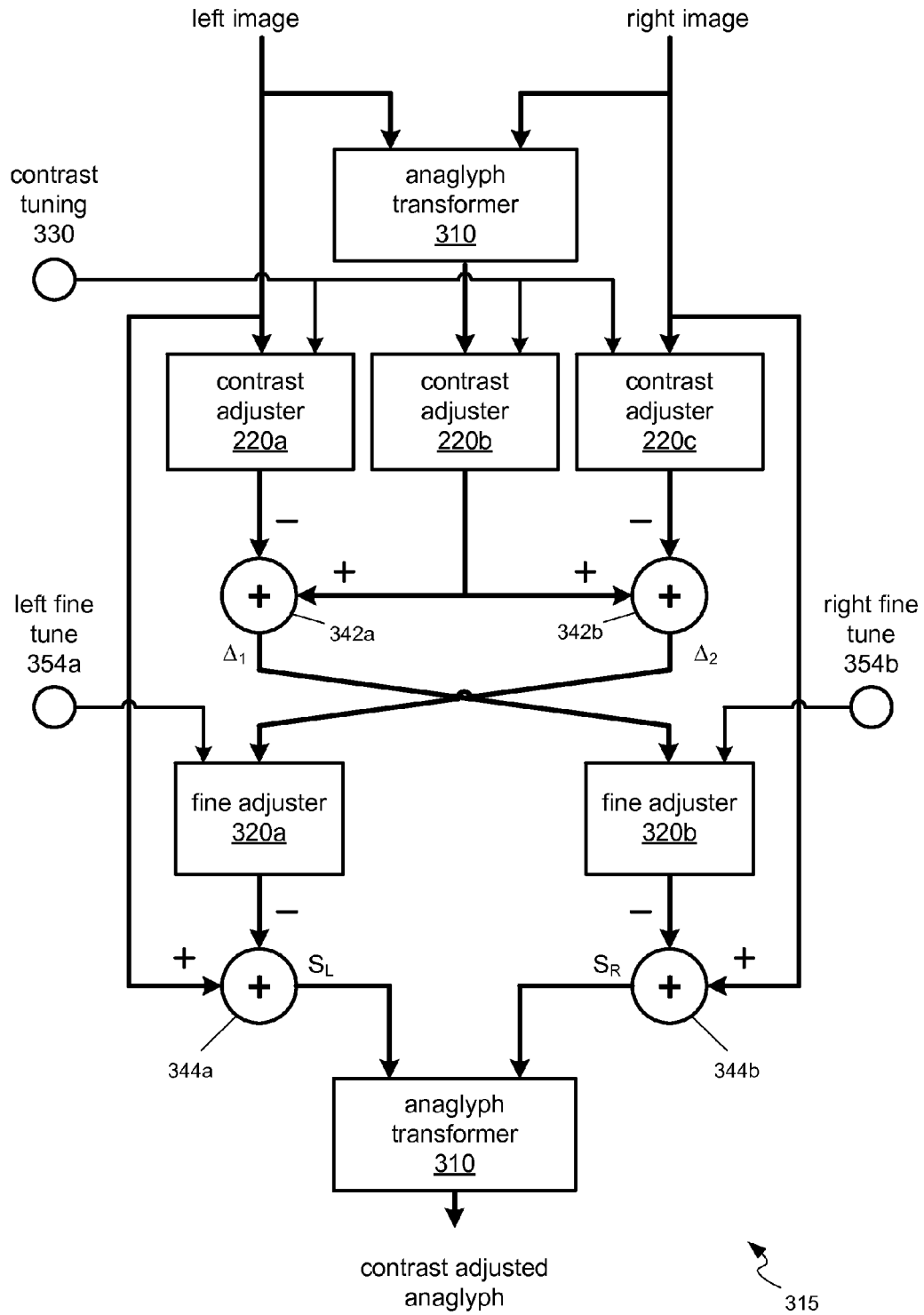
FIG. 3C depicts an embodiment of a system that provides contrast adjustment with reduced ghosting for anaglyph images.

In some implementations, the computed differences ($\Delta_1$, $\Delta_2$) from the upstream summing nodes 342a, 342b may be subtracted from opposite imaging channels, as depicted in FIG. 3C. The crossing of the computed differences ($\Delta_1$, $\Delta_2$) to opposite channels may occur before or after the fine adjusters 320a, 320b.

Figure 4:
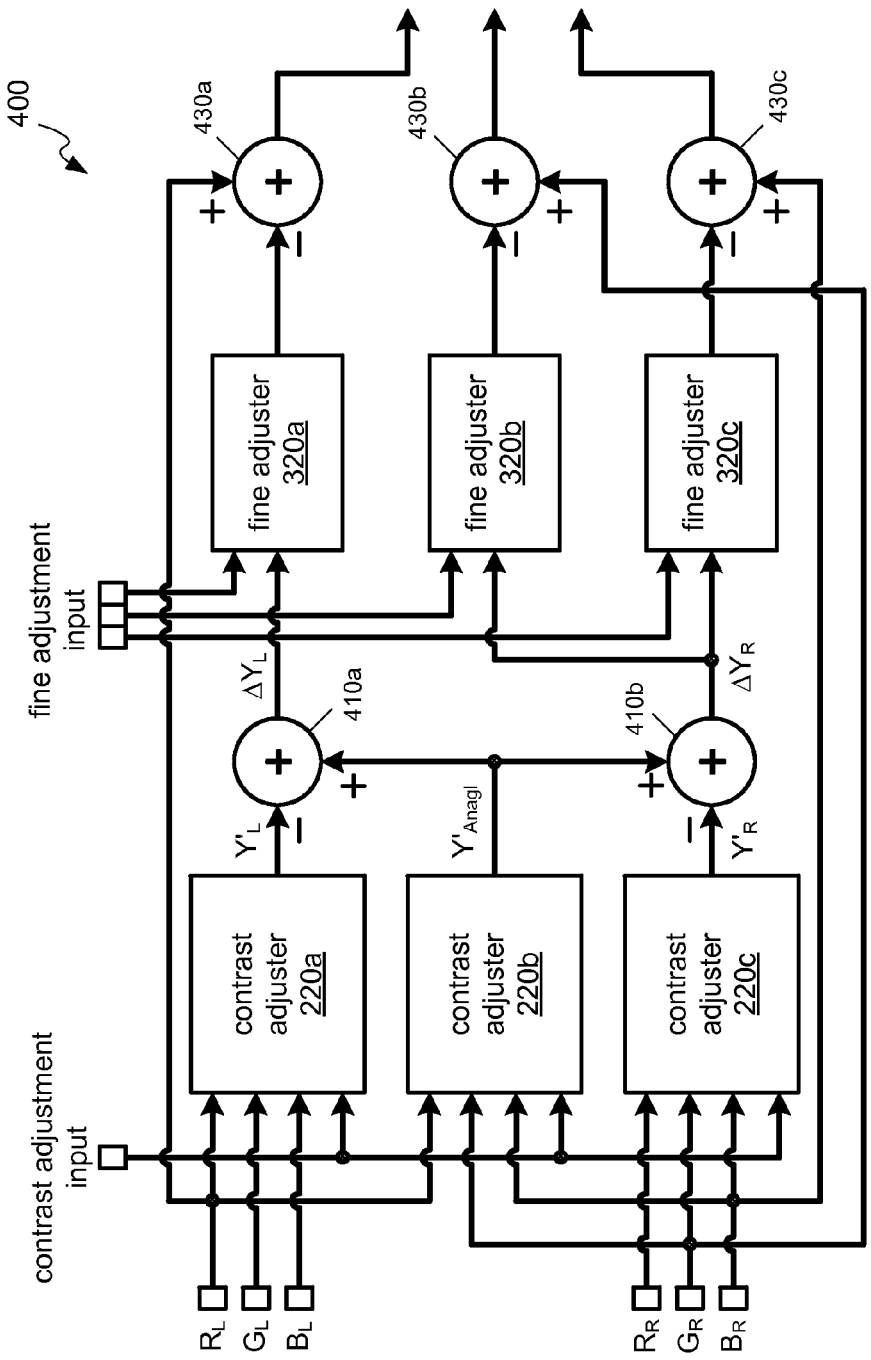
FIG. 4 depicts an embodiment of a system that provides contrast adjustment with reduced ghosting for anaglyph images.

FIG. 4 depicts an embodiment of a system 400 for implementing contrast adjustment in anaglyph imaging. According to this embodiment, red/green/blue signals from left and right stereographic images are received as input, though other signal components may be received in other embodiments. The embodiment shown in FIG. 4 is for explanatory purposes, and is not intended to limit the invention to the specific input signals shown.

The system 400 for implementing contrast adjustment may comprise one or more contrast adjusters 220a, 220b, 220c configured to receive one or more input signals derived from stereoscopic left and right images (not shown in the drawing). The signals received may be preprocessed (e.g., filtered, amplified, formatted, converted from one format to a different format) before being received at the one or more contrast adjusters 220a, 220b, 220c.

The one or more contrast adjusters 220a, 220b, 220c may be configured to apply at least one contrast adjustment to a received input signal, and to provide as output a contrast-adjusted signal. Contrast adjustments may be applied in any manner and be of any suitable type as described above in connection with FIG. 3A. In some implementations, the contrast-adjusted output signal comprises a contrast-adjusted luma signal Y'. According to some embodiments, a same contrast adjustment may be applied to the signals received by each of the one or more contrast adjusters 220a, 220b, 220c. In some cases, different contrast adjustments may be applied to the signals received by the one or more contrast adjusters.

The system 400 for implementing contrast adjustment may further comprise upstream summing nodes 410a, 410b that are configured to compute difference values in contrast-adjusted output signals received from the one or more contrast adjusters, as shown. For example, a first upstream summing node 410a may be configured to compute a difference ($\Delta Y_L$) between a contrast-adjusted luma signal ($Y'_L$) generated from a first stereographic image and a contrast-adjusted luma signal ($Y'_{Anagl}$) generated from a composite image signal, e.g., a composite anaglyph image signal generated from $R_L$, $G_R$, $B_R$ signal components.

A composite image signal may be formed by combining one or more image component signals from a first input stereographic image signal with one or more image component signals from a second input stereographic image signal. For example, a composite image signal may be formed by combining a red component signal ($R_L$) derived from a left stereographic image with green and blue component signals ($G_L$, $B_L$) derived from a right stereographic image, as depicted in FIG. 4. Contrast adjustment may then be applied to the composite image signal by contrast adjuster 220b.

In some embodiments, the system 400 for implementing contrast adjustment may further comprise one or more fine adjusters 320a, 320b, 320c. A fine adjuster may be configured to receive a difference signal from an upstream summing node, and to apply a fine adjustment to the difference signal. The fine adjustment may be any suitable type and may be applied in any manner as described above in connection with FIG. 3A. A same fine adjustment may be applied to all difference signals in some embodiments. In other embodiments, different fine adjustments may be applied to the received difference signals. In some implementations, fine adjusters may not be included in the system 400.

The system 400 for implementing contrast adjustment may further comprise downstream summing nodes 430a, 430b, 430c. The downstream summing nodes may be configured to receive signal components from the input stereographic image signals, and to subtract from the received signal components the computed difference signals (or fine adjusted versions thereof) that were produced by the upstream summing nodes 410a, 410b. In the illustrated embodiment, a first downstream summing node 430a subtracts a first fine-adjusted difference signal ($F_1(\Delta Y_L)$) from a red signal component ($R_L$) of the left stereographic image signal to provide an output signal component $R_{Lout}$. In this manner, the output anaglyph signals $R_{Lout}$, $G_{Rout}$, and $B_{Rout}$ may be provided and used to form a composite 2D anaglyph image. The output signals can be expressed by the following equations, according to one embodiment.

$$R_{Lout} = R_L - F_1[\Delta Y_L] \quad (9)$$

$$G_{Rout} = G_R - F_2[\Delta Y_R] \quad (10)$$

$$B_{Rout} = B_R - F_3[\Delta Y_R] \quad (11)$$

where $F_n[\ ]$ represents a fine adjustment applied to a signal. When no fine adjustment is employed, $F_n[Y]=Y$.

In various embodiments, the upstream and downstream summing nodes affect a signal compensation to the signal components of the input stereographic image signals that are used to generate a composite 2D anaglyph. The signal compensation reduces or eliminates ghosting artifacts that would otherwise be introduced by conventional contrast adjustments. As a result, the perceived 3D anaglyph image exhibits little or no ghosting artifacts. Output signals $R_{Lout}$, $G_{Rout}$, $B_{Rout}$ may be provided as a 2D composite anaglyph image for display on a video display.

In some embodiments, computed a differences ($\Delta Y_L$, $\Delta Y_R$) may be applied to opposite image channels, as described above in connection with FIG. 3C.

Although the embodiments shown in FIG. 3A, FIG. 3C, and FIG. 4 are directed to an anaglyph imaging process that utilizes two stereographic images, the systems and associated methods of operation may be modified to accommodate three or more stereographic images that are used to form an anaglyph.

Figure 5:
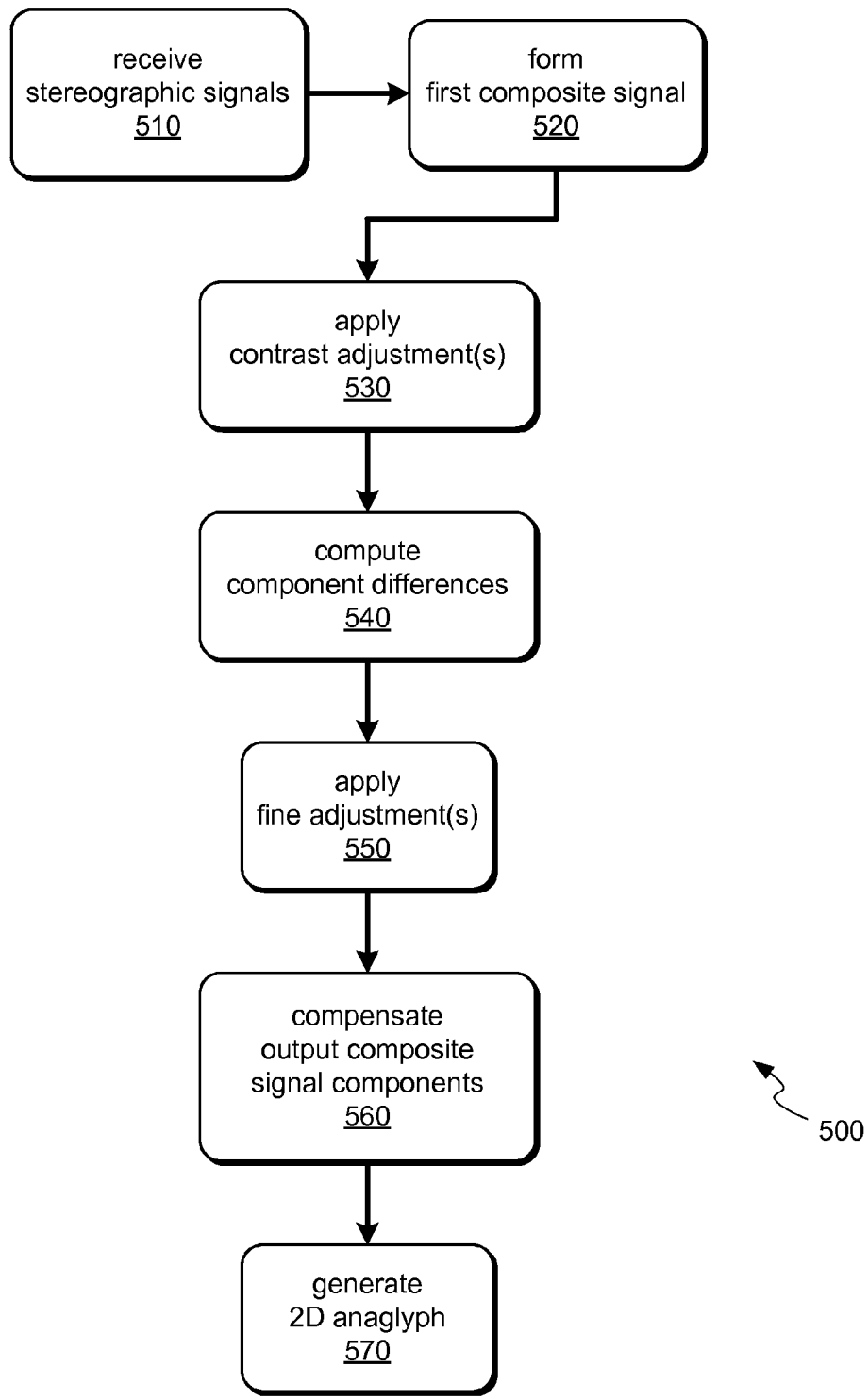
FIG. 5 outlines an embodiment of a method for implementing contrast adjustments for anaglyph images.

A method 500 for implementing contrast adjustment in an anaglyph imaging system is depicted in FIG. 5, according to one embodiment. The method may include additional acts in some embodiments, and may include fewer acts than those depicted in other embodiments. The method 500 may comprise receiving 510 input stereographic image signals. The receiving 510 may include receiving plural signal components from two or more stereographic images, e.g., red, green, blue signal components from left and right stereographic images, or black, yellow, cyan, magenta signal components from left, center, and right stereographic images. The method 500 may further include forming 520 a composite signal from two or more signal components of the received stereographic image signals, and applying 530 at least a contrast adjustment to the formed composite signal. The act of applying 530 may further include applying identical contrast adjustments to the received stereographic image signals, or one or more components thereof. In some embodiments, the act of applying 530 comprises computing a luma signal for each of the composite signal and stereographic image signals, and applying one or more contrast adjustments to the computed luma signals.

The method 500 for implementing contrast adjustment in an anaglyph imaging system may further comprise computing 540 signal component differences for contrast-adjusted signal components. The act of computing signal component differences may comprise calculating at least a first difference between a first signal component of a first stereographic image signal that has been subjected to contrast adjustment and a corresponding component of the composite signal that has been subjected to contrast adjustment. The act of computing 540 may further comprise calculating a second difference between a second signal component of a second stereographic image signal that has been subjected to contrast adjustment and a corresponding component of the composite signal that has been subjected to contrast adjustment. According to one embodiment, the computed difference is calculated for luma signals.

The method 500 may further comprise applying 550 one or more fine adjustments to the computed difference signals. In some embodiments, the act of applying fine adjustments may be omitted from the method 500.

The method 500 may comprise compensating 560 output composite signal components that are used to generate a 2D anaglyph. The act of compensating 560 may comprise subtracting differences that were computed in the act of computing 540, and that may have been subjected to fine adjustment, from signal components of the input stereographic image signals. For example, and in reference to FIG. 4, the act of compensating 560 may comprise functionality executed at downstream summing node 430a (e.g., $R_{Lout} = R_L - F_1[\Delta Y_L]$). In some embodiments, the act of compensating 560 includes compensating two or more signal components that are used to generate a 2D anaglyph.

Method 500 may further comprise generating 570 a 2D anaglyph signal from the compensated signal components. The generated 2D anaglyph signal may be a signal suitable to produce a 2D image displayed on a video monitor. The generated 2D anaglyph signal represents a contrast-adjusted anaglyph, and, when viewed using anaglyph glasses, may exhibit reduced or substantially eliminated ghosting artifacts as compared to a contrast-adjusted anaglyph image generated without compensation for contrast adjustment, e.g., as compared to a normal anaglyph image viewed on a video monitor to which conventional contrast adjustments are applied.

The embodiments of methods for implementing contrast adjustment for anaglyph images may be implemented on hardware, in software, or a combination thereof. For example, some or all acts of method 500 may be implemented using machine-readable instructions that are executed on at least one microprocessor, at least one digital signal processor, or a combination thereof. The machine-readable instructions may be embodied on at least one manufactured storage device comprising ROM or RAM type memory. The instructions may adapt the at least one microprocessor, at least one digital signal processor, or a combination thereof to cause a system to perform acts associated with contrast adjustment. In some embodiments, one or more acts may be implemented, wholly or in part, using field-programmable gate arrays (FPGAs).

Figure 6:
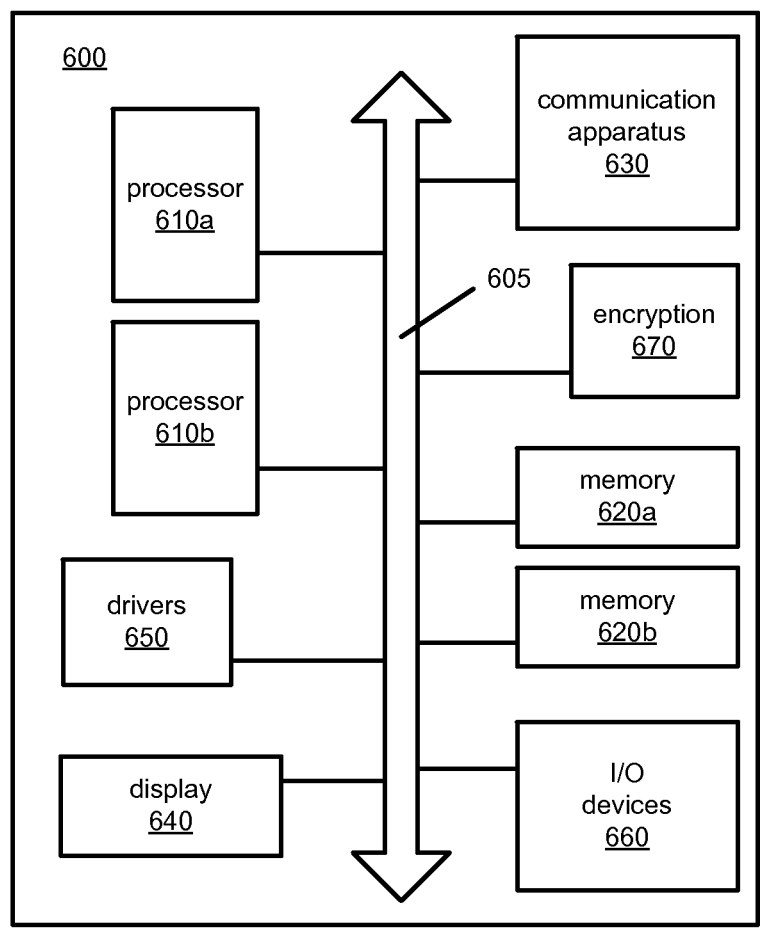
FIG. 6 depicts an embodiment of a system that may be used to provide contrast adjustments for anaglyph images.

A depiction, in block diagram, of a hardware configuration that may be used to implement embodiments of an anaglyph contrast-adjustment apparatus and related methods is shown in FIG. 6. According to some embodiments, an anaglyph contrast-adjustment apparatus may comprise a signal processing device 600 that has been specially adapted with machine-readable instructions to execute contrast adjustment to anaglyph images in accordance with the various embodiments of the present invention. According to some embodiments, a processing device 600 may comprise one or more electronic processors 610a, 610b, and one or more types of data storage devices 620a, 620b. A processor 610a, 610b may comprise any type and form of data processing device, e.g., any one or combination of a microprocessor, microcontroller, a digital signal processor, and a field-programmable gate array (FPGA). There may be more than one processor in the system in some embodiments, e.g., dual core or multi-core processors, or plural processors communicating with at least one controlling processor. In some cases, there may be a combination of processor types, e.g., a microprocessor and one or more FPGAs. When in operation, an operating system may execute on the processing device and provide for user operation of the apparatus, which may include running multiple software applications and/or programs on the processing device 600. The memory may include any type and form of RAM-type memory devices and ROM-type memory devices.

Processing device 600 may further include a display 640 (e.g., comprising any combination of a video monitor, an LCD display, a plasma display, an alpha-numeric display, LED indicators, etc.), one or more input/output devices 660 (e.g., keyboard, touchpad, buttons, switches, touch screen, microphone, speaker, printer), and communication apparatus 630 (e.g., networking software, networking cards or boards, wireless transceivers, and/or physical sockets). The processing device 600 may further include device drivers, e.g., software modules specifically designed to execute on the one or more processor(s) and adapt the processor(s) to communicate with and control system components. In some embodiments, processing device 600 includes encryption/decryption hardware and/or software 670 that may be used to encrypt selected outgoing data transmissions and decrypt incoming encrypted data transmissions. Encryption and decryption may include scrambling and descrambling television signals. Components of processing device 600 may communicate over a bus 605 that carries data and control signals between the components. The bus may provide for expansion of the system to include other components not shown in FIG. 6. Examples of processing devices include, but are not limited to, computers, laptops, tablet computers, netbooks, smart phones, mobile phones, personal digital assistants (PDAs), video gaming devices, television set-top boxes, automotive computers configured to connect to a network, video and still-photo cameras configured to connect to a network, and commercial or research instruments configured to connect to a network that have been specially adapted with machine readable instructions to receive, transmit, and/or process anaglyph signals.

The technology described herein may be embodied as a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments. Additionally, a method may include more acts than those illustrated, in some embodiments, and fewer acts than those illustrated in other embodiments.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A method for adjusting contrast of an anaglyph image, the method comprising:
receiving, at a first anaglyph transformer processor, a first input image signal and a second input image signal;
generating, at the first anaglyph transformer processor, a first anaglyph signal from the first input image signal and the second input image signal;
receiving and applying, at one or more contrast adjuster circuits, a contrast adjustment to the first input image signal, the second input image signal, and the first anaglyph signal;

calculating, within a first summing device, a first difference between the contrast-adjusted first input image signal and the contrast-adjusted first anaglyph signal;

calculating within the first summing device a second difference between the contrast-adjusted second input image signal and the contrast-adjusted first anaglyph signal; and receiving within a second summing device connected to a fine adjuster circuit signals for the first and second differences and calculating within a processor a fine adjustment value from summed first and second differences and applying a fine adjustment within the fine adjuster circuit as a gain adjustment, an offset adjustment, and a horizontal and vertical shift.

2. The method of claim 1, further comprising:
subtracting the first difference from the first input image signal to produce a first compensated image signal;
subtracting the second difference from the second input image signal to produce a second compensated image signal; and
generating a second anaglyph signal from the first compensated image signal and the second compensated image signal.

3. The method of claim 2, wherein subtracting the first difference from the first input image signal comprises subtracting the first difference from a component of the first input image signal.

4. The method of claim 2, further comprising providing the second anaglyph signal for display on a two-dimensional display.

5. The method of claim 2, wherein subtracting the second difference from the second input image signal comprises:
subtracting the second difference from a first component of the second input image signal; and
subtracting the second difference from a second component of the second input image signal.

6. The method of claim 1, wherein receiving the first input image signal comprises receiving a first stereographic image signal representative of a first scene, and receiving the second input image signal comprises receiving a second stereographic image signal representative of the first scene.

7. The method of claim 1, wherein applying a contrast adjustment comprises applying a same contrast adjustment to the first input image signal, the second input image signal, and the first anaglyph signal.

8. The method of claim 1, wherein applying a contrast adjustment comprises applying the contrast adjustment to a first component of the first input image signal, a first component of the second input image signal, and a first component of the first anaglyph signal.

9. The method of claim 8, wherein the first component of each image signal and anaglyph signal is a luma component.

10. The method of claim 8, wherein applying a contrast adjustment further comprises generating the first component of the first anaglyph signal from one or more components of the first input image signal and the second input image signal.

11. A system for adjusting contrast of an anaglyph image comprising:
a first anaglyph transformer processor configured to generate a first anaglyph image signal;
a contrast adjuster circuit configured to apply a contrast adjustment to the first anaglyph image signal, a first input image signal, and a second input image signal;
a first processor configured as a first summing device and configured to calculate a first difference between the contrast-adjusted first input image signal and the contrast-adjusted first anaglyph signal, and to calculate a second difference between the contrast-adjusted second input image signal and the contrast-adjusted first anaglyph signal;

a second processor configured as a second summing device and configured to receive first and second differences and calculate a fine adjustment value from summed first and second differences; and a fine adjuster circuit configured to receive a signal for the fine adjustment value and apply a fine adjustment as a gain adjustment, an offset adjustment, and a horizontal and vertical shift.

12. The system of claim 11, further comprising:
a third summing device configured to subtract the first difference from the first input image signal to produce a first compensated image signal, and to subtract the second difference from the second input image signal to produce a second compensated image signal; and
a second anaglyph transformer processor configured to generate a second anaglyph signal from the first compensated image signal and the second compensated image signal.

13. The system of claim 12, wherein the third summing device is configured to subtract the first difference from a component of the first input image signal.

14. The system of claim 12, wherein the second anaglyph transformer processor provides the second anaglyph signal for displaying on a two-dimensional display.

15. The system of claim 12, wherein said fine adjuster circuit is configured to apply a fine adjustment to the second difference.

16. The system of claim 11, wherein the first anaglyph transformer processor is configured to receive one or more signal components from a first stereographic image signal representative of a first scene, and a second stereographic image signal representative of the first scene.

17. The system of claim 16, wherein the contrast adjuster processor is configured to apply a same contrast adjustment to the first input stereographic image signal, the second input stereographic image signal, and the first anaglyph signal.

18. The system of claim 17, wherein the contrast adjuster processor is configured to generate luma components for the first input stereographic image signal, the second input stereographic image signal, and the first anaglyph signal, and apply the same contrast adjustment to the luma components.

19. The system of claim 17, wherein the same contrast adjustment comprises a gamma function.

20. The system of claim 17, wherein the same contrast adjustment comprises an S-curve function.

21. The system of claim 17, wherein the same contrast adjustment comprises an adjustment based upon histograms.

22. The system of claim 17, wherein the same contrast adjustment comprises an adjustment based upon data from a look-up-table.

23. A non-transitory storage medium that includes machine-readable instructions that, when executed by at least one processor, adapt the at least one processor to: receive a first input image signal and a second input image signal;
generate a first anaglyph signal from the first input image signal and the second input image signal;
receive and apply a contrast adjustment to the first input image signal, the second input image signal, and the first anaglyph signal;
calculate a first difference between the contrast-adjusted first input image signal and the contrast-adjusted first anaglyph signal;

calculate a second difference between the contrast-adjusted second input image signal and the contrast-adjusted first anaglyph signal;

sum first and second differences and calculate a fine adjustment value; and apply a fine adjustment to the summed first and second differences as a gain adjustment, an offset adjustment, and a horizontal and vertical shift.

24. The non-transitory storage medium of claim 23, further comprising machine-readable instructions that, when executed by the at least one processor, adapt the at least one processor to:

subtract the first difference from the first input image signal to produce a first compensated image signal;

subtract the second difference from the second input image signal to produce a second compensated image signal; and generate a second anaglyph signal from the first compensated image signal and the second compensated image signal.

25. The non-transitory storage medium of claim 23, wherein receiving the first input image signal comprises receiving a first stereographic image signal representative of a first scene, and receiving the second input image signal comprises receiving a second stereographic image signal representative of the first scene.

26. The non-transitory storage medium of claim 23, wherein applying a contrast adjustment comprises applying a same contrast adjustment to the first input image signal, the second input image signal, and the first anaglyph signal.

27. The non-transitory storage medium of claim 23, wherein applying a contrast adjustment comprises applying the contrast adjustment to a first component of the first input image signal, a first component of the second input image signal, and a first component of the first anaglyph signal.

28. The non-transitory storage medium of claim 27, wherein the first component of each image signal and anaglyph signal is a luma component.

29. The non-transitory storage medium of claim 27, wherein the contrast adjustment comprises one or both of a gamma function and an S-curve function.

30. A system for adjusting contrast of an anaglyph image comprising:

a contrast adjuster processor configured to receive a first input image signal and a second input image signal and to generate a contrast-adjusted first luma signal from the first input image signal, a contrast-adjusted second luma signal from the second input image signal, and a contrast-adjusted third luma signal of an anaglyph image signal that is produced from the first input image signal and the second input image signal;

a first processor operative as a first summing node and configured to determine a first difference between the first luma signal and the third luma signal;

a second processor operative as a second summing node and configured to subtract the first difference from a first signal component of the first input image signal wherein said second processor is further configured as a third summing node and receives first and second differences and calculates a fine adjustment value from summed first and second differences; and a fine adjuster circuit configured to receive a signal for the fine adjustment value and apply a fine adjustment as a gain adjustment, an offset adjustment, and a horizontal and vertical shift.

31. The system of claim 30, wherein the first input image signal and the second input image signal are representative of a pair of stereographic images.

32. The system of claim 30, wherein the first signal component is a red signal component of a left stereographic image.

33. The system of claim 30, wherein the contrast adjuster circuit is configured to apply one or both of a gamma function and an S-curve function to each luma signal.

34. The system of claim 30, wherein the fine adjuster circuit is located between the first summing node and the second summing node.

* * * * *